United States Patent
Kitsopoulos

(10) Patent No.: US 7,242,588 B2
(45) Date of Patent: Jul. 10, 2007

(54) MULTIFUNCTION MODULAR ELECTRONIC APPARATUS

(76) Inventor: Sotirios Constantine Kitsopoulos, 10 Park Ave., Apt. #16S, New York, NY (US) 10016

( * ) Notice: Subject to any disclaimer, the term of this patent is extended or adjusted under 35 U.S.C. 154(b) by 0 days.

(21) Appl. No.: 11/225,445

(22) Filed: Sep. 13, 2005

(65) Prior Publication Data

US 2007/0058351 A1   Mar. 15, 2007

(51) Int. Cl.
*H05K 7/00* (2006.01)

(52) U.S. Cl. ............ 361/729; 361/679; 361/683; 361/728; 439/19; 439/55; 455/349; 455/572

(58) Field of Classification Search ........ 361/679–683, 361/728–733, 686; 439/19, 55; 455/349, 455/572

See application file for complete search history.

(56) References Cited

U.S. PATENT DOCUMENTS

| | | | | |
|---|---|---|---|---|
| 5,887,373 A * | 3/1999 | Byers | ............... | 40/733 |
| 5,987,704 A * | 11/1999 | Tang | ............... | 16/354 |
| 6,111,772 A * | 8/2000 | Lee et al. | ............... | 363/146 |
| 6,141,569 A * | 10/2000 | Weisshappel et al. | ....... | 455/572 |
| 6,275,376 B1 * | 8/2001 | Moon | ............... | 361/683 |
| 6,845,005 B2 | 1/2005 | Shimano et al. | | |
| 6,928,264 B2 * | 8/2005 | Botteck | ............... | 455/41.2 |
| 6,952,861 B2 * | 10/2005 | Ynosencio | ............... | 16/366 |
| 2002/0109706 A1 * | 8/2002 | Lincke et al. | ............... | 345/700 |
| 2003/0112590 A1 * | 6/2003 | Shimano et al. | ............... | 361/683 |
| 2004/0038717 A1 * | 2/2004 | Mahany et al. | ............... | 455/572 |
| 2004/0090742 A1 * | 5/2004 | Son et al. | ............... | 361/686 |
| 2004/0185830 A1 * | 9/2004 | Joao et al. | ............... | 455/410 |
| 2005/0185364 A1 * | 8/2005 | Bell et al. | ............... | 361/679 |
| 2005/0250440 A1 * | 11/2005 | Zhou et al. | ............... | 455/12.1 |

OTHER PUBLICATIONS

"Flybook-80GIG-XP Pro" mini-notebook product by Dialogue; description and images available on web site of Convergent Technology LLC at www.convergentech.com, no date.

* cited by examiner

*Primary Examiner*—Dean A. Reichard
*Assistant Examiner*—Xiaoliang Chen
(74) *Attorney, Agent, or Firm*—Maurice M. de Picciotto, Esq.

(57) ABSTRACT

A multifunction modular electronic apparatus for performing information technology and telecommunications functions comprises a first module (101) for performing a plurality of first functions; a second module (102) having substantially the same physical dimensions as the first module for performing second functions; and a hinging mechanism (103, 104, 105) for enabling the two modules to be mechanically coupled, to rotate relative to each other over a full range of 360 degrees while remaining stably mechanically coupled in any intermediate position over the range, and to be fully separated from each other.

12 Claims, 3 Drawing Sheets

200

300

MULTIFUNCTION MODULAR ELECTRONIC APPARATUS

FIELD OF THE INVENTION

The present invention generally relates to electronic apparatus, and more particularly, to a multifunction modular electronic apparatus for performing information technology and telecommunications functions.

BACKGROUND OF THE INVENTION

Users of portable electronic devices often must carry more that one such device in order to be able to use and implement diverse desired information technology and telecommunications (IT&T) functions. Typically existing function-specific portable electronic devices include laptop computers, mobile wireless telephones, digital cameras, personal digital assistants (PDA), electronic books, music players, video players, electronic-game sets, geostationary positioning systems (GPS), and a variety of other application-specific portable electronic gadgets each offering a different use or application.

Progress in miniaturization already enables manufacturers to offer today several such functions combined in a single apparatus. A state-of-the-art hand-held device, for example the iPAQ Model 6315 of the Hewlett Packard company, offers: full PDA functions; cellular telephone; wireless connectivity for data (Wi-Fi and Bluetooth); digital camera; MP3 music player; reading of downloaded books; sound recording; touch-sensitive display and attachable miniature keyboard; simplified software programs such as Microsoft® Word, Outlook and Excel; all in a space of approx. 4.5"×3"×0.75". However, such highly portable devices always offer compromises between what users need or want and what technology allows manufacturers to offer at market prices. The HP iPAQ, for example, could use more memory (e.g. a hard disk) and a higher-speed processor, the latter implying a need for bigger battery power. Also, its small display screen makes viewing of websites and reading of text rather uncomfortable. Although existing notebook computers incorporating several of the functions mentioned above offer display screens of adequate size, such computers are generally bulky and heavy to carry.

Thus there exists a need for a portable electronic IT&T apparatus that is flexibly adaptable to users' needs by being modular and expandable while maintaining overall sizes and weights of the order, for example, of those of thin paperback books. In addition, commercially available existing portable systems do not offer the user the flexibility and ability to selectively choose and combine among a variety of needed functions performed by modules that may be either mechanically coupled together or physically separated, and which are compatibly dimensioned. Also, commercially available existing portable systems lack the ability to functionally connect several modules in order to yield powerful systems and achieve synergies among the modules by, for example, optimally distributing component parts and functions among the modules.

SUMMARY OF THE INVENTION

The foregoing needs are met in an illustrative embodiment of the invention wherein a multifunction modular electronic apparatus for performing IT&T functions comprises a first module for performing a plurality of first IT&T functions; at least one other module having substantially the same physical dimensions as the first module for performing second functions identical, complementary, or supplementary to, or independent of, the functions performed by the first module; and means for enabling the two modules to be mechanically coupled, to rotate relative to each other over a full range of 360 degrees while remaining stably mechanically coupled in any intermediate position over said range, and to be fully separated from each other.

In accordance with one illustrative embodiment of the invention, each module is in the form of a flat essentially rectangular parallelepipedic case having two opposing flat main faces, two opposing parallel narrow flat sides and two opposing half-cylindrical end surfaces having identical half-circular cross sections, whereby hinging means hold one half-cylindrical end surface of the first module into contact with one half-cylindrical end surface of the second module, with their respective cylindrical axes parallel to each other, thereby allowing the two modules to rotate without sliding relative to each other by a full 360 degrees.

In accordance with a further illustrative embodiment of the invention, the hinging means comprise an essentially rectangular parallelepipedic hinging piece having two opposing parallel faces each of a length smaller than the length of the case and a width equal to twice the depth of the case; two opposing parallel flat sides of a length equal to twice the depth of the case and a width equal to such depth; and two opposing half-cylindrical end surfaces of axial length equal to the length of the parallel faces and having identical half-circular cross sections; whereby the hinging piece has in each of its flat sides two cylindrical cavities coaxially coincident with the axes of the two opposing half-cylindrical end surfaces of the hinging piece. Each module comprises one rectangular notch of length equal to the length of the hinging piece cut into each module's two opposing half-cylindrical end surfaces, such notch having a planar innermost internal surface and two opposing flat sides ending at the module half-cylindrical end surfaces. Each of the two opposing flat sides includes first cylindrical receptacles positioned coaxially with the axis of the corresponding half-cylindrical side of the module. The first receptacles are located so as to become coaxially coincident with corresponding cavities of the hinging piece when the hinging piece is fitted into the notch. Furthermore, the cylindrical receptacles of the notches and the corresponding cylindrical cavities of the hinging pieces contain latching mechanisms allowing the hinging pieces to latch into the module receptacles so as to securely hold the two modules together.

In a further illustrative embodiment of the invention, wireless radio frequency communication means are located in each of the modules for enabling communication between the modules in their fully separate as well as in their mechanically coupled positions.

In an alternate illustrative embodiment of the invention, the hinging means comprise a pair of receptacles formed in each of the opposing parallel narrow flat sides of the modules, each one of the receptacles being coaxially positioned with the axis of the half-cylindrical end surfaces of each module; and a pair of elongated plates removably insertable into the modules, each plate having two parallel cylindrical pins affixed thereto at a distance equal to twice the radius of the half-cylindrical surface, whereby the pins are respectively adapted for insertion and latching into the corresponding receptacles in the modules thereby mechanically coupling the two modules while allowing rotation of the modules relative to each other over a range of 360 degrees.

BRIEF DESCRIPTION OF THE DRAWINGS

Further features and advantages of the present invention will become apparent from the following detailed description taken together with the drawings in which.

DETAILED DESCRIPTION

Figure 1:
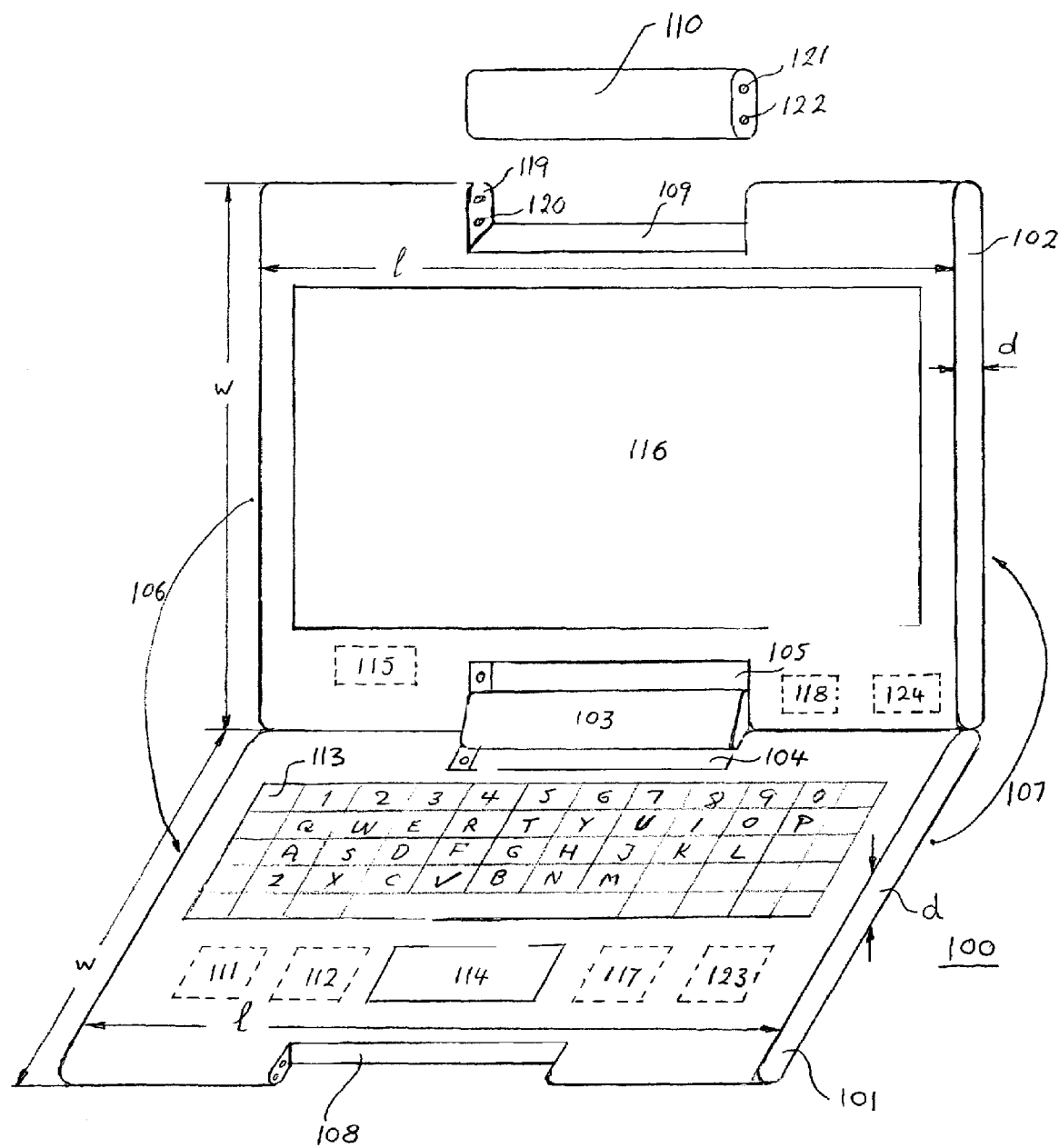
FIG. 1 shows a perspective view of a modular portable electronic apparatus according to an illustrative embodiment of the invention.

FIG. 1 shows in perspective one illustrative embodiment of a modular portable electronic apparatus 100 comprising a first module 101 and a second module 102. As shown, the two modules, which have substantially the same overall external dimensions, are mechanically coupled together by means of a hinging piece 103 positioned and latched within adjacent module notches 104 and 105, respectively located in modules 101 and 102. The modules 101 and 102 are each in the form of an essentially rectangular parallelepipedic case having two opposing flat main faces of length l and width w, two opposing parallel narrow flat sides of length w and width d, and two opposing half-cylindrical end surfaces of axial length l having identical half-circular cross sections of diameter d. The hinging piece 103 mechanically couples the two modules 101 and 102 so that their respective half-cylindrical end surfaces remain in contact along their axial length l. The modules 101 and 102 can thus rotate without sliding relative to each other over a range of 360° as illustratively indicated by the directional arcs 106 and 107, with their respective half-cylindrical end surfaces in contact with each other. Although not shown in FIG. 1, the two modules 101 and 102 can be selectively fully closed with their respective flat main faces against each other when the modules are rotated in the direction of arc 106 or in that of arc 107. As illustrated in FIG. 1, the modules 101 and 102 are shown mechanically coupled in an intermediate position within a 360° angle.

As will be explained below, the hinging mechanism, comprising the hinging piece 103 and the two notches 104 and 105, is designed to enable both modules 101 and 102 to separate fully from each other by decoupling the hinging piece 103 from either one of the two modules or from both modules 101 and 102 thereby physically separating the two modules from each other.

As shown in FIG. 1, the first module 101 further comprises a second notch 108, opposite and identical to its first notch 104, but located in the opposite half-cylindrical end surface than the one containing notch 104. Similarly, the second module 102 further comprises a second notch 109, opposite and identical to its first notch 105, but located in the opposite half-cylindrical end surface of module 102 than the one containing notch 105. A second hinging piece 110, identical to the hinging piece 103, can be inserted and latched into the second notch 109 so that if desired by a user, a third module which is not shown in FIG. 1, may be mechanically coupled to the second module 102 via the hinging piece 110, in the same manner as the modules 101 and 102 are mechanically coupled together by hinging piece 103.

Alternatively, in the event that a third module is not needed or desired by a user and when both modules 101 and 102 are to be fully closed on each other (either along the directional arc 106 or directional arc 107), the hinging piece 110 would then be inserted and latched into notch 109 of module 102 as well as notch 108 of the first module 101 thereby completing the full closure of modules 101 and 102.

The modules 101 and 102 are of the type containing a variety of electronic components. As schematically shown in FIG. 1, the first module 101 may illustratively comprise an electronic digital processor 111 coupled to an information receiving and storing device 112 adapted for receiving and storing a plurality of information technology and telecommunications functions to be performed by the first module 101. The first module 101 further illustratively comprises an input and control means for the module 101, such as for example a combination of a keyboard 113 and a mouse pad 114. The processor 111, the information receiving and storing device 112 and the input and control means 113 and 114, are all of well known commercially available types readily available through a variety of marketing sources of electronic devices and components specifically destined for computer and related peripheral applications. Electrical power sources 123 and 124 supply power to the various electronic devices and components of modules 101 and 102, respectively.

The second module 102 may, if desired, include an information receiving and storing device 115 for storing a set of information technology and telecommunications functions to be performed by the second module 102, and other electronic devices and components, such as a display screen 116.

Exchanges of information and communications between the first module 101 and the second module 102, either in their mechanically coupled position via hinging piece 103 as shown in FIG. 1 or when fully separated from each other (i.e., when the hinging piece 103 is removed out of the notch 104 or out of both notches 104 and 105), can be achieved by a pair of wireless transceivers 117 and 118, respectively located in the first module 101 and the second module 102. The wireless transceivers 117 and 118 are of well known and of readily available types for enabling communications under wireless communications standards, such as for example the Bluetooth communication standard or the IEEE 802.11 standard.

It is well within the spirit and teachings of the present invention that the modules 101 and 102 (as well as any additional module or modules desired to be coupled to the module 101 and/or to the module 102 via hinging pieces and module notches combinations of the type shown in FIG. 1), may incorporate a variety of known electronic devices such as touch-sensitive display screens, compact disc (CD) players/burners, digital video disc (DVD) players/burners, video-game sets, and similar electronic apparatus.

An illustrative arrangement for linking and latching a hinging piece, e.g. 110, into a module notch, e.g. 109, comprises a combination of a pair of holding prongs 119 and 120 retractably positioned in each of the two opposing sides of the notch and adapted to be inserted into a pair of cavities 121 and 122 located in each one of the two opposing end surfaces of the hinging piece. Alternatively, the holding prongs may be located within the pair of cavities 121 and 122 of the hinging piece and adapted to be inserted into the pair of receptacles located in each one of the opposing sides of the notch. Details of one such illustrative embodiment of a linking and holding arrangement will be described below with reference to FIGS. 2A, 2B, 3A and 3B wherein the holding prongs are positioned in the opposing sides of the notch and the cavities are formed in the end surfaces of the hinging piece.

Figure 2A:
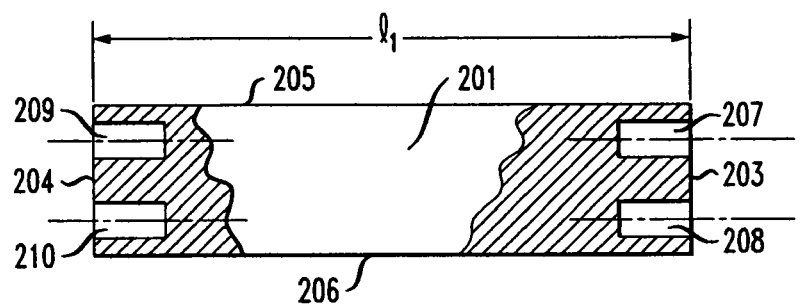
FIGS. 2A and 2B show two enlarged views of one illustrative embodiment of a hinging piece used to mechanically couple the modules shown in FIG. 1.
Figure 2B:
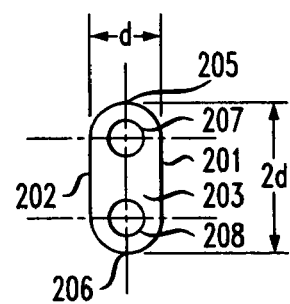

Shown in FIG. 2A in partial cross section is a hinging piece 200 of the type of the hinging pieces 103 and 110 described above in connection with the illustrative embodiment of FIG. 1. FIG. 2B shows an end view of the hinging piece 200. Referring to both FIGS. 2A and 2B, the hinging piece 200 is of an essentially parallelepipedic form having two opposing parallel faces 201 and 202, each of a length $l_1$ smaller than the length l of the modules 101 and 102 of FIG. 1. The hinging piece 200 has two opposing parallel flat sides 203 and 204 each of a length equal to twice the depth d of the modules 101 and 102. Two opposing half-cylindrical end surfaces 205 and 206 have an axial length $l_1$, and have each identical half-circular cross sections of diameter d. Located in each one of the opposite flat sides 203 and 204 are two cylindrical cavities 207-208 and 209-210, respectively shown in cross section in flat sides 203 and 204, of a diameter smaller than the diameter d of the half-cylindrical end surfaces 205 and 206. The cavities 207, 209 and 208, 210 are located coaxially coincident with the longitudinal axes of the two opposing half-cylindrical end surfaces 205 and 206, respectively.

Figure 3A:
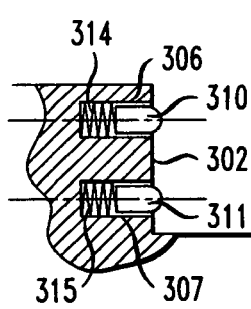
FIGS. 3A and 3B show two enlarged views of one illustrative embodiment of a module notch adapted to receive a hinging piece in accordance with an embodiment of the invention.
Figure 3B:
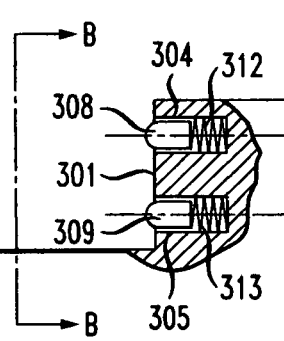

Shown in FIG. 3A in partial cross section is a module notch 300 of the type of the notches 104, 105, 108 and 109 described above in connection with the illustrative embodiment of FIG. 1. FIG. 3B shows an end view of the notch 300 along the B-B line of FIG. 3A. Referring to both FIGS. 3A and 3B, the notch 300 comprises two planar opposing end surfaces 301 and 302, and a planar innermost internal surface 303, with the two end surfaces 301 and 302 ending at the modules' half-cylindrical end surfaces which are shown in FIG. 1. The overall dimensions of the length, width and thickness of the notch 300 are substantially equal to those of the hinging piece 200 for allowing such a hinging piece to fit into the notch. Each of the two opposing end surfaces 301 and 302 includes a pair of cylindrical receptacles 304-305 and 306-307, respectively. The first set of receptacles 304 and 306 is located coaxially with the axis of the half-cylindrical side of the notch, and the second set of receptacles 305 and 307, which are proximate to the planar innermost internal surface 303, is at a distance equal to d from the axis of the first set of receptacles. The receptacles 304-307 are located so as to become coaxially coincident with the cavities 207-210 of the hinging piece 200 when such hinging piece is fitted into the notch.

Located within each of the receptacles 304-307 is a prong 308-311, respectively, which is retractably affixed inside each receptacle by a spring mechanism 312-315, as illustrated in FIG. 3A. The prongs of notch 300 are designed and dimensioned for insertion into the cavities of the hinging piece 200 when such hinging piece is fitted into the notch of a module. Mechanical coupling of two modules is achieved by inserting the hinging piece 200 into the notch 300. The prongs 308 and 310 are first retracted into their respective cavities by the pressure of the flat sides of the hinging piece being inserted. When the axes of the notch receptacles and the hinging piece cavities become collocated, the prongs snap back by the action of their respective springs into their original position, thus inserting themselves into the hinging piece cavities. As described in FIG. 1 in connection with the mechanical coupling of the two modules 101 and 102 via the hinging piece 103, the prongs when inserted and latch into their corresponding cavities with the two half-cylindrical end surfaces of the modules in contact with each other allow rotation of the modules relative to each other over a range of 360 degrees, while securely holding the modules coupled to each other. In accordance with an embodiment of the invention, the prongs 309 and 311 are used for stowing the hinging piece 200 inside the notch 300 when such piece is not used either for mechanically coupling the two modules or for latching closed two coupled modules. Other holding and latching mechanisms could be used by those skilled in the art without departing from the spirit and teachings of the present invention.

In a still further illustrative embodiment of the invention, a hinging piece, e.g. 103 or 200, may be used to complete an electrical power-source connection via the prongs-cavities linking arrangement between two mechanically coupled modules. In addition, a hinging piece may illustratively include conventional or rechargeable batteries, or an electrical converter for charging rechargeable batteries, or both. Alternatively, a power source arrangement could be contained either inside the hinging piece, or within one module, or within each one of the modules, or within the hinging piece and one or more modules. In each such case, the hinging piece would be used to complete the electrical power connection between modules in addition to its hinging and mechanical coupling functions.

Figure 4:
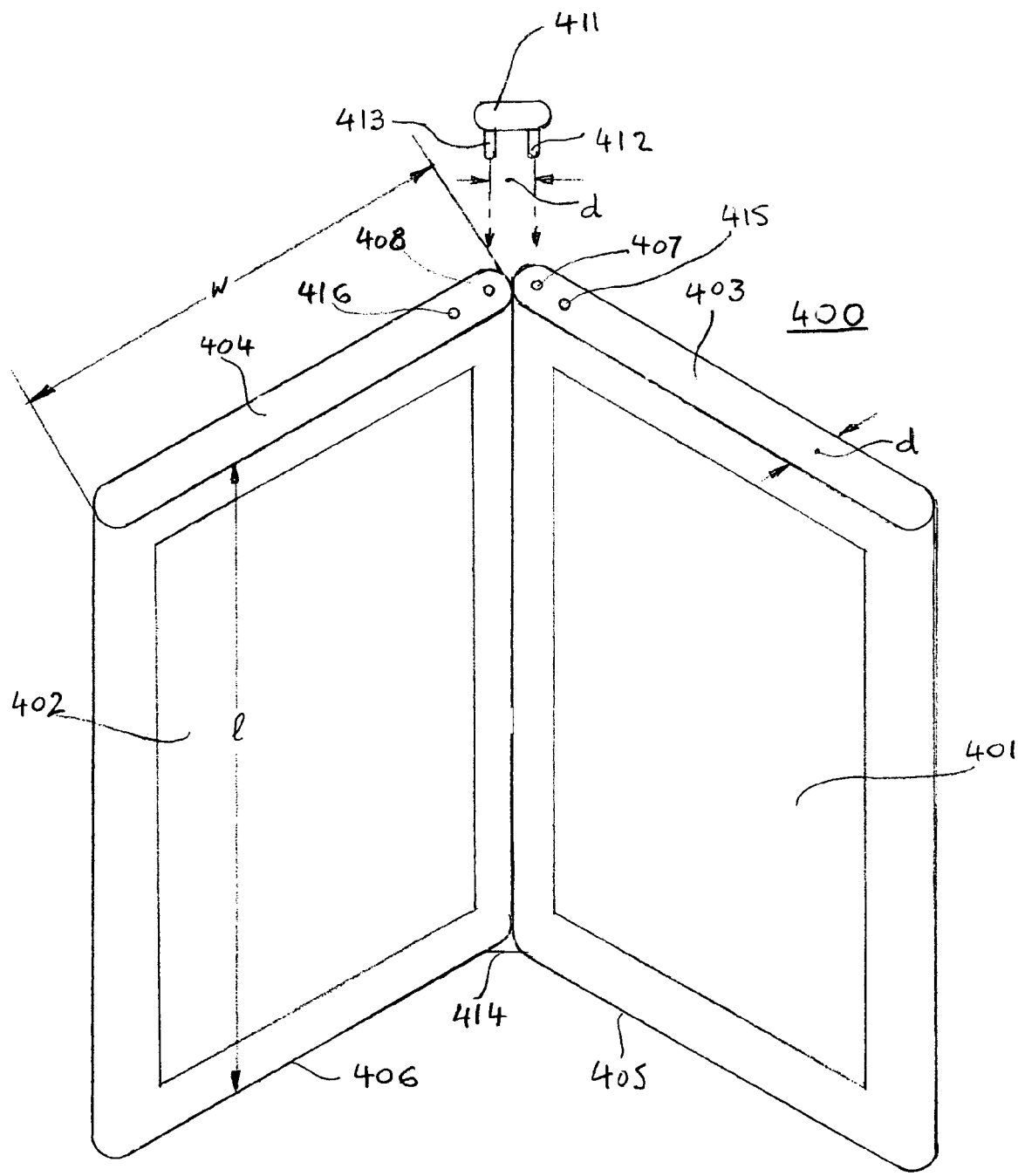
FIG. 4 shows an enlarged perspective view of a portion of an illustrative embodiment of an alternative hinging mechanism used to mechanically couple two modules.

Referring to an alternative further illustrative embodiment, FIG. 4 shows in perspective a modular portable electronic apparatus 400 comprising a first module 401 and a second module 402. As mentioned in connection with the modules 101 and 102 of FIG. 1, the modules 401 and 402 are each also in the form of an essentially rectangular parallelepipedic case having two opposing flat main faces, two opposing parallel narrow flat sides 403-406 of width d, and two opposing half-cylindrical end surfaces having identical half-circular cross sections of diameter d. Formed in each of the opposing parallel narrow flat sides 403-406, are cylindrical receptacles 407-410 (409 and 410 are not visible in FIG. 4).

Each cylindrical receptacle is coaxially positioned with the axis of the half-cylindrical end surface of the modules. A first elongated hinging plate 411 comprises a pair of parallel cylindrical pins 412 and 413 perpendicularly affixed to the plate and positioned from each other at a distance d. The pins 412 and 413 are dimensioned and adapted for insertion respectively into corresponding receptacles 407 and 408 of modules 401 and 402, respectively. A second elongated hinging plate 414, identical to the first plate 411, comprises a pair of cylindrical pins (not shown) adapted for insertion in corresponding receptacles formed in the opposite flat sides 405 and 406. By inserting and latching the pins of plates 411 and 414 into the receptacles, the modules 401 and 402 become mechanically coupled thereby enabling their respective half-cylindrical end surfaces to remain in contact along their entire axial length. The modules 401 and 402 can thus rotate without sliding relative to each other over a range of 360°. The pins are held in their respective receptacles by latching arrangements of known types. Although not shown in FIG. 4, the two modules 401 and 402 can be selectively fully closed with their respective flat main faces against each other, or fully separated when the hinging plates 411 and 414 are removed from the modules. As illustrated in FIG. 4, the modules 401 and 402 are shown mechanically coupled in an intermediate position within a 360° angle.

In addition, cylindrical receptacles 415 and 416 are formed in each narrow flat sides 403 and 404, respectively, with each such receptacle having its axis parallel to the axes of the half-cylindrical surfaces of the modules 401 and 402 and positioned at a distance d from the adjacent receptacles 407 and 408, respectively. The additional receptacle 415 is used when stowing the hinging plate 411 into the first module 401, while the additional receptacle 416 would be used when stowing the hinging plate 411 into the second module 402. Similarly, additional cylindrical receptacles (not shown) for stowing hinging plate 414 would be formed in the opposite flat sides 405 and 406.

It is to be understood that the above-described illustrative embodiments have been presented merely to illustrate the pertinent inventive concepts of the present invention. Numerous other modifications may be devised by those skilled in the art without departing from the spirit, principles, teachings and scope of the invention.

What is claimed is:

1. A multifunction modular electronic apparatus for performing information technology and telecommunications functions comprising:
    a first module containing electronic means for performing a plurality of first information technology and telecommunications functions, including wireless communication, said first module having two parallel opposing main faces and two pairs of opposing end surfaces, whereby at least one of said end surfaces is a half-cylindrical surface;
    at least one other module containing second electronic means and having identical shape and physical dimensions as the first module for performing second functions identical, complementary, or supplementary to, or independent of, the functions performed by the first module including wireless communication; and
    hinging means for holding one half-cylindrical end surface of the first module into tight contact with a corresponding half-cylindrical end surface of the other module, with the respective cylindrical axes of said half-cylindrical surfaces parallel to each other for enabling the two modules to be mechanically coupled, to rotate without sliding relative to each other over a full range of 360 degrees around said axes while remaining stably mechanically coupled in any intermediate position over said range, and to be fully separated from each other.

2. An apparatus according to claim 1, wherein each module is in the form of a flat rectangular case with its two opposing flat main faces having a length l and a width w, two opposing parallel narrow sides of length w and width d, and two opposing half-cylindrical end surfaces having an axial length l and identical half-circular cross sections of diameter d.

3. An apparatus according to claim 2, wherein the hinging means for mechanically coupling the two modules comprise an essentially rectangular parallelepipedic hinging piece having two opposing parallel faces each of a length l1 smaller than the length l of the case and a width equal to twice the depth d of the case; two opposing parallel flat sides of a length equal to twice said depth d and a width equal to said depth d; and two opposing half-cylindrical end surfaces of axial length equal to the length of the parallel faces and having identical half-circular cross sections of diameter d; whereby said hinging piece has in each of its flat sides two cylindrical cavities of a diameter smaller than the depth d, said cavities being coaxially coincident with the axes of the two opposing half-cylindrical end surfaces of the hinging piece; and wherein each module comprises one rectangular notch of length l1 cut into each module's two opposing half-cylindrical end surfaces, said notch having a planar innermost internal surface and two opposing flat sides ending at the module half-cylindrical end surfaces; and wherein said two opposing flat sides include first cylindrical receptacles positioned coaxially with the axis of the corresponding half-cylindrical side of the module, said first receptacles being located so as to become coaxially coincident with corresponding cavities of the hinging piece when said hinging piece is fitted into the notch.

4. An apparatus according to claim 3, further comprising a prong retractably affixed inside each of the first cylindrical receptacles in each notch of the two modules and adapted for insertion into the corresponding cavities of the hinging piece when said hinging piece is fitted into the notch of each module, thereby mechanically coupling the two modules while allowing rotation of the modules relative to each other over a range of 360 degrees.

5. An apparatus according to claim 4, further comprising a latching mechanism with a hinging piece, identical to said essentially rectangular parallelepipedic hinging piece, located and fitted in the respective notches of the opposite half-cylindrical end surface of each module for enabling the two modules to be latched closed.

6. An apparatus according to claim 4, further comprising a latching mechanism including a pair of prongs, identical to the prongs of the first cylindrical receptacles and located inside a pair of second cylindrical receptacles of the notch, for stowing the hinging piece inside the notch when said piece is not used either for mechanically coupling the two modules or for latching closed two coupled modules.

7. An apparatus according to claim 3, wherein the hinging piece further completes an electrical power-source connection between the mechanically coupled modules; and wherein means are provided for preventing said power-source connection from being inadvertently effected in the wrong polarity.

8. An apparatus according to claim 7, wherein the power source for one or more modules includes conventional or rechargeable batteries, or an electrical converter for charging rechargeable batteries, said power source being contained either inside the hinging piece, or within one module, or within each one of the modules, or within the hinging piece and one or more modules.

9. An apparatus according to claim 1, wherein each of the electronic means of said first module and of said other module comprise wireless radio-frequency communications means located in each module for enabling wireless communication between the modules in their fully separated and in their mechanically coupled positions.

10. An apparatus according to claim 2, further comprising means for providing sufficient friction between the two apposed half-cylindrical end surfaces of modules that are mechanically coupled together, thereby allowing the modules to remain firmly in place at any angle relative to each other within a 360-degree range.

11. An apparatus according to claim 2, wherein the hinging means for mechanically coupling the two modules comprise:
    a pair of receptacles formed in each of the opposing parallel narrow flat sides of the modules, one of said receptacles being positioned coaxially with the axis of the half-cylindrical end surfaces of each module and the other of said receptacles being positioned at a distance d from said one receptacle; and a pair of elongated plates removably insertable into the modules by means of two parallel cylindrical pins perpendicularly affixed to each of said plates at a distance d from each other, whereby said pins are respectively adapted for insertion and latching into the corresponding receptacles in the modules thereby mechanically coupling the two modules while allowing rotation of the modules relative to each other over a range of 360 degrees.

12. An apparatus according to claim 11, wherein the hinging means further complete an electrical power-source connection between the mechanically coupled modules; and wherein means are provided for preventing said power-source connection from being inadvertently effected in the wrong polarity.

* * * * *